United States Patent [19]
Odaka et al.

[11] Patent Number: 5,388,089
[45] Date of Patent: Feb. 7, 1995

[54] APPARATUS FOR CONNECTING MULTIPLEX TRANSMISSION SYSTEMS

[75] Inventors: Kunio Odaka; Kyosuke Hashimoto, both of Hiratsuka, Japan

[73] Assignee: The Furukawa Electric Co., Ltd., Tokyo, Japan

[21] Appl. No.: 50,153

[22] PCT Filed: Aug. 30, 1991

[86] PCT No.: PCT/JP91/01163
§ 371 Date: Apr. 26, 1993
§ 102(e) Date: Apr. 26, 1993

[87] PCT Pub. No.: WO93/05602
PCT Pub. Date: Mar. 18, 1993

[51] Int. Cl.[6] .................................. H04L 12/46
[52] U.S. Cl. .................. 370/67; 370/85.13; 370/85.14
[58] Field of Search .................. 370/60, 60.1, 61, 79, 370/82, 84, 85.13, 85.14, 94.1, 99

[56] References Cited
U.S. PATENT DOCUMENTS

| | | | |
|---|---|---|---|
| 4,972,407 | 11/1990 | Kawai | 370/61 X |
| 5,014,265 | 5/1991 | Hahne et al. | 370/61 X |
| 5,042,029 | 8/1991 | Hayakawa | 370/61 X |
| 5,084,871 | 1/1992 | Carn et al. | 370/94.3 X |
| 5,247,514 | 9/1993 | Matsuda et al. | 370/61 |

*Primary Examiner*—Melvin Marcelo
*Attorney, Agent, or Firm*—Frishauf, Holtz, Goodman & Woodward

[57] ABSTRACT

At least two multiplex nodes (11 to 15 or 21 to 25) are connected to each other by means of a data bus (10a or 20a), at least two data buses (10a, 20a) are connected with the individual multiplex nodes (11 to 15, 21 to 25), and a gateway node (30) is connected individually to the data buses (10a, 20a). An internal memory (30d) stores data inputted through the data buses (10a, 20a) and a CPU (30a) discriminates the data inputted through the data buses (10a, 20a). The CPU (30a) discriminates data sent from one multiplex node and stores it in the internal memory (30d), and converts it into data for the other line for sending or transmits it without converting it.

2 Claims, 8 Drawing Sheets

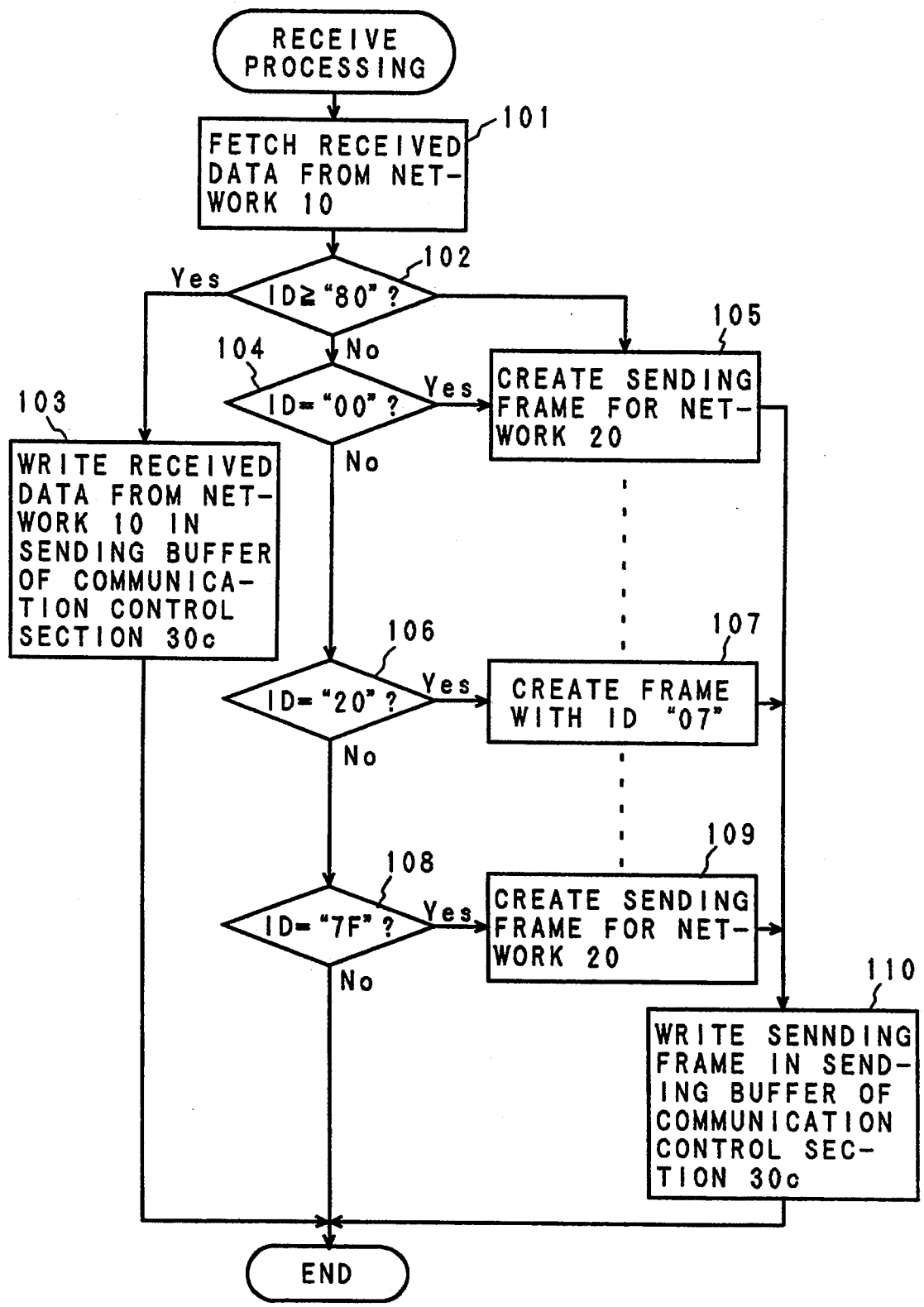

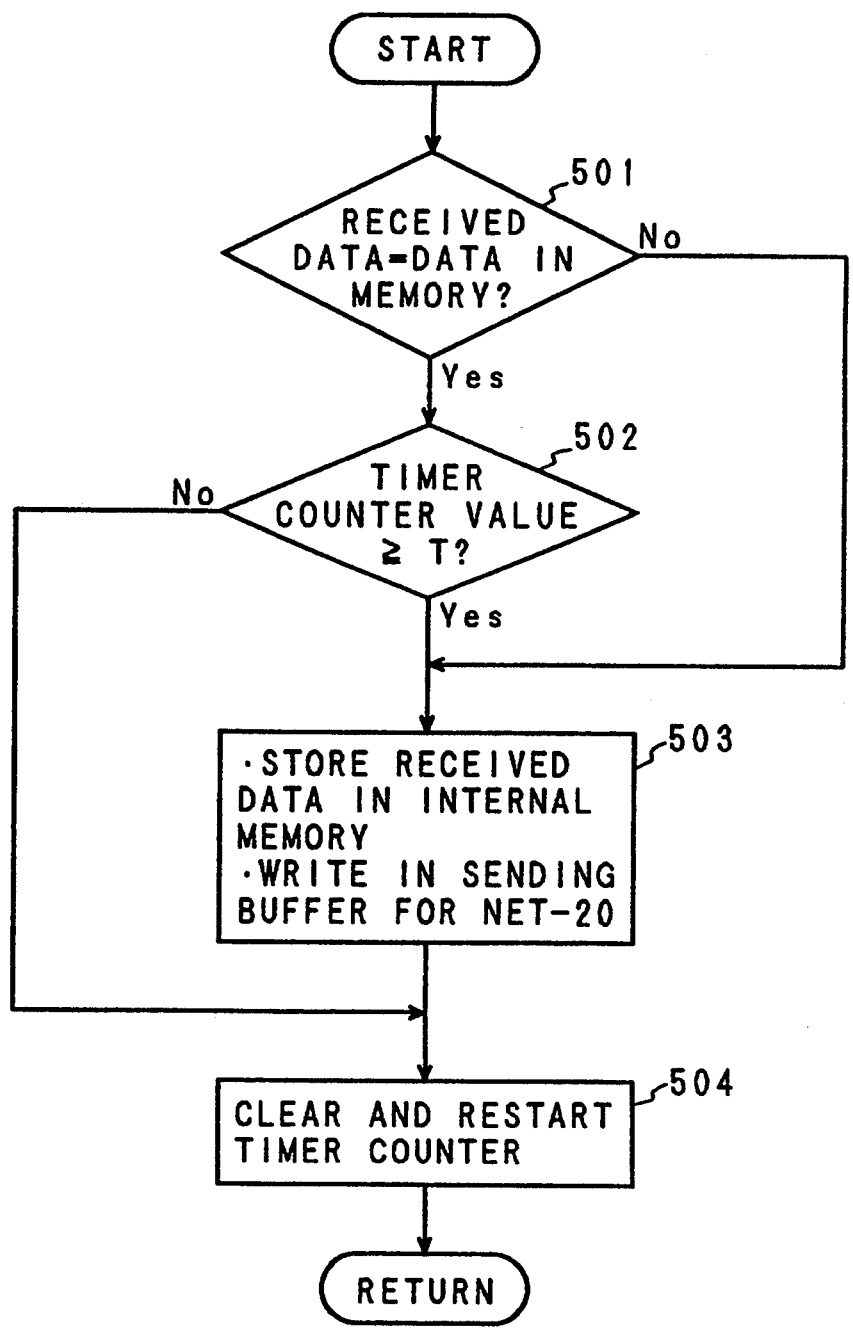

APPARATUS FOR CONNECTING MULTIPLEX TRANSMISSION SYSTEMS

TECHNICAL FIELD

The present invention relates to a multiplex transmission system for transmitting data between multiplex nodes connected to a plurality of networks.

BACKGROUND OF THE INVENTION

In some multiplex transmission systems, a plurality of multiplex nodes each having a communication control circuit therein are connected to one another by means of a common signal transmission line (data bus) formed of a twisted pair wire, thus constituting a looped multiplex communication network (hereinafter referred to as "network") for multiplex transmission of data signals. Further, there are developed versions of these multiplex transmission systems in which a plurality of networks, having the aforesaid configuration and various response characteristics (e.g., different transmission speeds), are connected by means of a transmission control section (gateway node) which has a gateway function based on a CPU, whereby multiplex transmission is effected. The communication control circuit is formed of a microprocessor (CPU) for effecting electronic process control, a multiplex transmission control IC for effecting network transmission control, a buffer and a interface for sending and receiving signals, etc.

In one such multiplex transmission system, the gateway node receives transmit data from a multiplex node (sending multiplex node) which is connected to one network. If the gateway node concludes that the transmit data is a data signal to be subjected to a gateway function, moreover, it quickly sends this data signal to another network.

When a request-to-send is addressed from a receiving multiplex node connected to the one network to a sending multiplex node connected to the other network, the gateway node transmits this request-to-send to a relevant sending multiplex node. When return data corresponding to the request-to-send is sent from this sending multiplex node, the gateway node fetches this return data, and then transmits this return data to the receiving multiplex node.

When a new multiplex node is connected to the one network so that data from this multiplex node is transmitted to the other network, in this multiplex transmission system, however, it is necessary to interrupt the use of the multiplex transmission system and modify the design of a complicated data conversion operation of the gateway node. Thus, the modification of the design of the data conversion operation takes time and prohibits the use of the system in the meantime, and besides, entails higher manufacturing cost.

In the case where a multiplex node in the other network needs just a small part of data subjected to multiplex transmission by means of the one network, the gateway node must use its gateway function for all the transmitted data. Accordingly, the amount of data processing in the multiplex node in the other network increases, as well as the data traffic in the other network increases.

SUMMARY OF THE INVENTION

An object of this invention is to provide an overall multiplex transmission system capable of efficiently carrying out data transmission without interrupting use of the multiplex transmission system when data transmission from a newly connected multiplex node of a busy network to another network is needed.

Another object of this invention is to provide an overall multiplex transmission system capable of reducing the amount of data processing in a receiving-side multiplex node and the traffic in networks.

According to one aspect of the present invention, an apparatus is provided for connecting at least two multiplex transmission systems, each multiplex transmission system of the type referred to as a "network" including at least two multiplex nodes and a signal transmission line interconnecting the multiplex nodes. The connecting apparatus comprises transmission control means including a storage section for storing data supplied through each of the signal transmission lines, and means for transmitting the stored data for data transmission among the multiplex transmission systems. The transmission control means further includes means for determining whether transmission of transmit data supplied from one of said at least two multiplex transmission systems to another of said at least two multiplex transmission systems is possible, in accordance with a state of use of the signal transmission line of said another multiplex transmission system, and for determining whether storage of the transmit data in the storage section is possible; means for storing the transmit data in the storage section when transmission of the transmit data is impossible and at the same time storage of the transmit data is possible, and means for transmitting the stored transmit data to the signal transmission line of said another of the multiplex transmission systems when transmission of the transmit data becomes possible; and means for informing said one of the multiplex transmission systems of a transmission/storage inability state when neither transmission nor storage of the transmit data is possible.

According to an aspect of this invention, a discriminating section discriminates identification data, among the data sent from the multiplex nodes and stored in a storage section through the signal transmission lines, and determines whether or not to make a data conversion for data of the other line for sending. If the data conversion is necessary, the data is converted in accordance with the identification data, and is then transmitted to receiving-side multiplex node of a network for the other line. If the data conversion is unnecessary, the data is transmitted to the receiving-side multiplex node without being converted. Thus, even in the case where a newly added multiplex node communicates with a multiplex node of the other network, the design of the data conversion operation need not be modified, so that the multiplex transmission system can be used continuously.

BRIEF DESCRIPTION OF THE DRAWINGS

The drawings show one embodiment of this invention, in which:

FIG. 3 is a flow chart for illustrating receive processing operation of a first embodiment of a gateway node shown in FIG. 1;

FIG. 8 is a flow chart for illustrating receive processing operation of a fourth embodiment of a gateway node shown in FIG. 7.

DETAILED DESCRIPTION

An embodiment of this invention will now be described with reference to the drawings of FIGS. 1 to 8.

Figure 1:
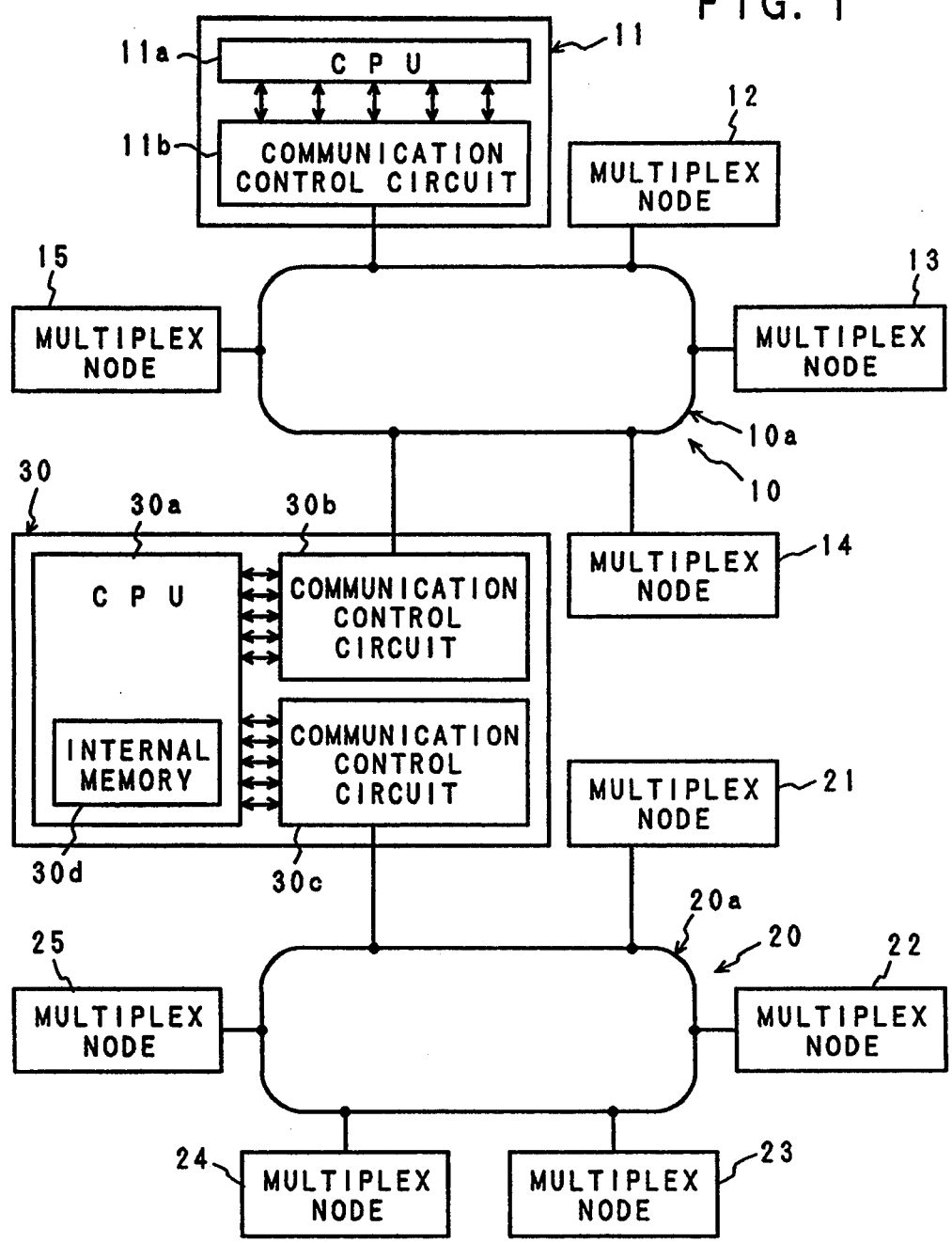
FIG. 1 is a block diagram showing an arrangement of one embodiment of an overall multiplex transmission system according to this invention.

Referring to FIG. 1, multiplex nodes 11 to 15 and 21 to 25 are formed of blocks of the same arrangement, although they are different in response characteristics (e.g., transmission speed). For the convenience of illustration, therefore, the arrangement of the multiplex node 11 will be described on behalf of the others herein.

The multiplex node 11 is constructed so that a CPU 11a for effecting electronic process control is connected with a communication control circuit 11b, which is formed of a multiplex transmission control IC for effecting network transmission control, a buffer and a interface for sending and receiving signals, etc.

The respective CPUs of the multiplex nodes 11 to 15 are connected to a common multiplex transmission line (data bus) 10a through their corresponding communication control circuits which have the same response characteristics (e.g., high data transmission speed at which data signals are transmitted), thus constituting a network 10. In sending signals, each communication control circuit writes data from the CPU in the buffer, and sends out data from the buffer to the data bus 10a through the interface when the write-operation is finished. In receiving signals, moreover, each communication control circuit writes, in the buffer, data applied thereto from the data bus 10a through the interface, and sends out data from the buffer to the CPU when the write-operation is finished.

The respective CPUs of the multiplex nodes 21 to 25 are connected to a common data bus 20a through their corresponding communication control circuits which have the same response characteristics (e.g., data transmission speed lower than that of the multiplex nodes 11 to 15), thus constituting a network 20. Each communication control circuit, like those of the multiplex nodes 11 to 15, sends and receives data signals to and from the CPU and the data bus 20a.

The data buses 10a and 20a are data buses which are formed of, e.g., twisted pair wires with transmission speeds of 100 Kbps or more and tens of Kbps, respectively, and the multiplex nodes 11 to 15 and 21 to 25 transmit signals, such as data frames and acknowledge (hereinafter referred to as "ACK") signals, through the data buses 10a and 20a.

A gateway node 30 is constructed so that a CPU 30a for multiplex transmission control is connected with communication control circuits 30b and 30c, an internal memory 30d, etc. Each of the communication control circuits 30b and 30c is formed of a control IC, network-use buffers and interfaces for sending and receiving data signals to and from each network, etc. In sending signals, the communication control circuits 30b and 30c write data from the CPU 30a in the network-use sending buffer, and send out data from the sending buffer to the networks 10 and 20 through the interfaces when the write-operation is finished. In receiving signals, moreover, the communication control circuits 30b and 30c write, in the network-use receiving buffers, data applied thereto from the networks 10 and 20 through the interfaces, and send out data from the receiving buffers to the CPU 30a, thereby sending and receiving data signals to and from the networks 10 and 20, when the write-operation is finished.

The CPU 30a is connected to the networks 10 and 20 through the communication control circuits 30b and 30c, respectively. This CPU 30a writes, in the internal memory 30d, data fetched from the data bus 10a or 20a for each multiplex node in response to a request-to-send and stored in the network-use receiving buffer, and determines whether or not to make data conversion (e.g., frame conversion to modify the frame length of a data frame composed of the aforesaid data or frame conversion to change the ID value in the data frame or the list of data bits of data areas) in accordance with identification (ID) data for the aforesaid data. If the data conversion is necessary, tile CPU 30a fulfills its gateway function such that data is read from the internal memory 30d and converted into a data signal corresponding to the response characteristic of the other network, and is then sent back to a requested multiplex node. If the data conversion is unnecessary, on the other hand, the CPU 30a reads the data from the internal memory 30d, and sends it back entire without converting it into the data signal corresponding to the response characteristic of the other network. Thus, signals can be transmitted between the data buses 10a and 20a of the networks 10 and 20.

When the above-described multiplex transmission system is applied to a vehicle, such as a motor vehicle, for example, the network 10 is connected with multiplex nodes, such as a brake control computer, steering control computer, transmission computer, suspension computer, etc., thus constituting a running control system. On the other hand, the network 20 is connected with multiplex nodes, such as electronic meters, air conditioner switch, combination switch, etc., thus constituting a body control system. When the gateway is designed, the CPU 30a determines in advance how and which data in the data frame from the network 10 should be subjected to frame conversion before being transmitted to the network 20, according to the individual ID data. In the embodiment, predetermined frame conversion is made in the case where the ID data ranges from "00" to "7F", and no frame conversion is made in the case where the ID data is "80" or above.

FIG. 2 is a diagram showing one embodiment of a format configuration of data frames used in the case where the multiplex transmission system of the present invention is applied to a vehicle. Each data frame has a data structure including a start bit, ID data, data, an ACK signal area, etc.

The start bit is a specific bit which indicates the start of the frame. The ID data is composed of an address indicative of the destination, an address indicative of the local station, and information indicative of the data length of the data, or the properties (sensor value information, warning information, etc.) of the frame data. The ACK signal area is composed of a plurality of bit areas. In the ACK signal area, bit areas corresponding to the respective addresses of the individual multiplex nodes are assigned to the multiplex nodes, and ACK signals to be sent back when the frame is normally received by the individual receiving multiplex nodes are arranged in the bit areas. Sending multiplex nodes can confirm normal reception by the returned ACK signals.

Figure 2A:
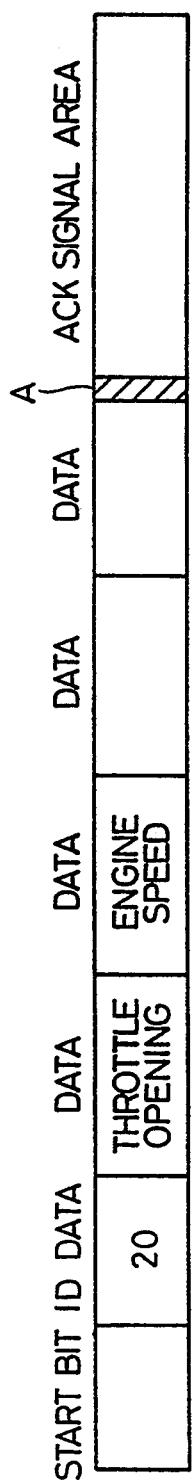
FIG. 2 is a diagram showing one embodiment of a format configuration of data frames used in the case where the multiplex transmission system of this invention is applied to a vehicle such as a motor vehicle.

In this embodiment, the multiplex node 11 sends a signal A for a check engine carried on the frame of FIG. 2(a) whose ID is "20", along with the throttle opening and engine speed, to the multiplex node 21 as a request source for sending. In sending back the check engine signal A to the multiplex node 21, it is more efficient to carry a side brake switch signal B, which should be also sent to the multiplex node 21, on the same frame. Accordingly, the CPU 30a sends back the signal B on the frame of FIG. 2(b) whose ID after frame conversion is "07". Further, the frame of FIG. 2(c) whose ID is "80" carries thereon a signal C for a newly added multiplex node, e.g., the multiplex node 15.

Referring now to the flow chart of FIG. 3, receive processing operation of a first embodiment of tile gateway node for data transmission between the individual networks will be described. In connection with this flow chart, the process operation will be described for the cases of representative frames whose IDs are "00", "20", "7F", and "80", individually. For the IDs from "00" to "20" and the IDs from "20" to "7F", however, the gateway node creates sending frames corresponding to the individual IDs.

On receiving a data frame from the network 10, the CPU 30a fetches this frame from the receiving buffer of the communication control section 30b (Step 101), and determines whether the ID of the frame is "80" or not (Step 102).

Figure 2B:
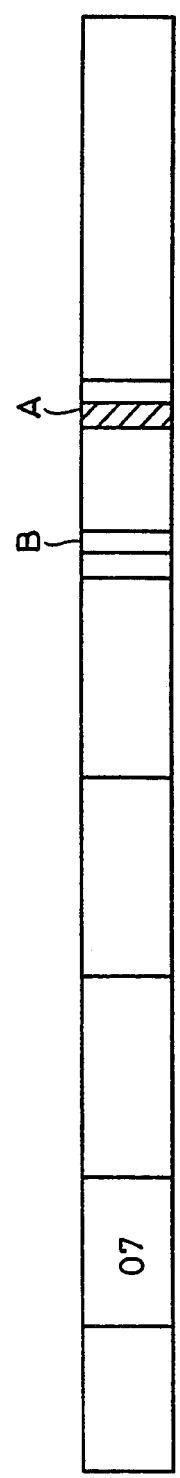
Figure 2C:

If the ID is "80", that is, in the case of the data frame shown in FIG. 2(c), the CPU 30a writes this frame from the network 10 directly in the sending buffer of the communication control section 30c without making the frame conversion (Step 103). If the ID is not "80", whether the ID is "00" or not is determined (Step 104).

If the ID is "00", the CPU 30a converts data frame from the network 10 into a sending frame for the network 20 which corresponds to this "00" (Step 105). Then, this sending frame is written in the sending buffer of the communication control section 30c (Step 110). If the ID is not "00", on the other hand, a number corresponding to the ID is discriminated. If no number corresponds to the ID, whether the ID is "20" or not is then determined (Step 106).

If the ID is "20", that is, in the case of the data frame shown in FIG. 2(a), the CPU 30a converts this frame from the network 10 into a sending frame (see FIG. 2(b)) for the network 20 whose ID corresponding to "20" is "07" (Step 107). Then, this sending frame is written in the sending buffer of the communication control section 30c (Step 110). If the ID is not "20", on the other hand, a number corresponding to the ID is discriminated. If no number corresponds to the ID, whether the ID is "7F" or not is then determined (Step 108).

If the ID is "7F", the CPU 30a converts the data frame from the network 10 into a sending frame for the network 20 which corresponds to the aforesaid "7F" (Step 109). Then, this sending frame is written in the sending buffer of the communication control section 30c (Step 110). If the ID is not "7F", on the other hand, the aforesaid receive processing is finished.

Thus, when writing the data in the network-use buffer is finished, the communication control circuit 30c can send back the data frame, comprised of ID data, a plurality of data, etc., in the sending buffer of the network 20 to the multiplex node of the network 20 to which a request-to-send has been addressed.

Accordingly, if the ID data is data for an area to be subjected to frame conversion, in the present embodiment, the frame conversion can be made corresponding to the aforesaid ID. If the ID data is data for an area not to undergo frame conversion, its frame can be sent back directly to the other network. Thus, in the present embodiment, even though data is sent from a multiplex node newly added during the use of the multiplex transmission system, it is unnecessary to interrupt the use of the multiplex transmission system and modify the design of the data conversion operation of a complicated transmission control section, and the aforesaid data frame can be sent back directly to the other network. According to the present embodiment, moreover, some ID data requires no such process as frame conversion, so that the storage capacity of a program memory of the transmission control section can be made small, and high-speed receive processing can be effected.

According to the description in connection with the present embodiment, the data frame is sent from a high-speed network to a low-speed network. However, the present invention is not limited to this arrangement, and the same receive processing can be effected also in the ease where the data frame is sent from a low-speed network to a high-speed network. Thus, the data transmission can be carried out efficiently.

The following is a description of a second embodiment of the multiplex transmission system according to this invention, in which the internal memory 30d of the gateway node 30 shown in FIG. 1 is used as a memory for saving data to be transmitted.

If the network 20 is busy and jammed with data transmission when transmit data is to be sent from the network 10 to the network 20, for example, the gateway node 30 cannot send the transmit data to the network 20. If the storage capacity of the internal memory 30d is exceeded, moreover, the network 10 must periodically send the same transmit data, so that the network 10 is jammed inside with data transmission, thus hindering the transmission of other transmit data.

According to the second embodiment, therefore, the CPU 30a is connected to the networks 10 and 20 through the communication control circuits 30b and 30c, respectively, and determines whether or not data fetched from the data bus 10a or 20a for each multiplex node and stored in the network-use buffer can be sent to the other network. If the other network is engaged in data transmission so that the data stored in the network-use buffer cannot be sent, the CPU 30a then temporarily writes and stores the transmit data in the internal memory 30d for save. When sending the data to the other network is allowed, the CPU 30a fulfills its gateway function such that the stored transmit data is read from the internal memory 30d for save and converted into a data signal corresponding to the response characteristic of the other network, and is then sent to the multiplex node of the other network. Thus, signals can be transmitted between the data buses 10a and 20a of the networks 10 and 20.

Figure 4:
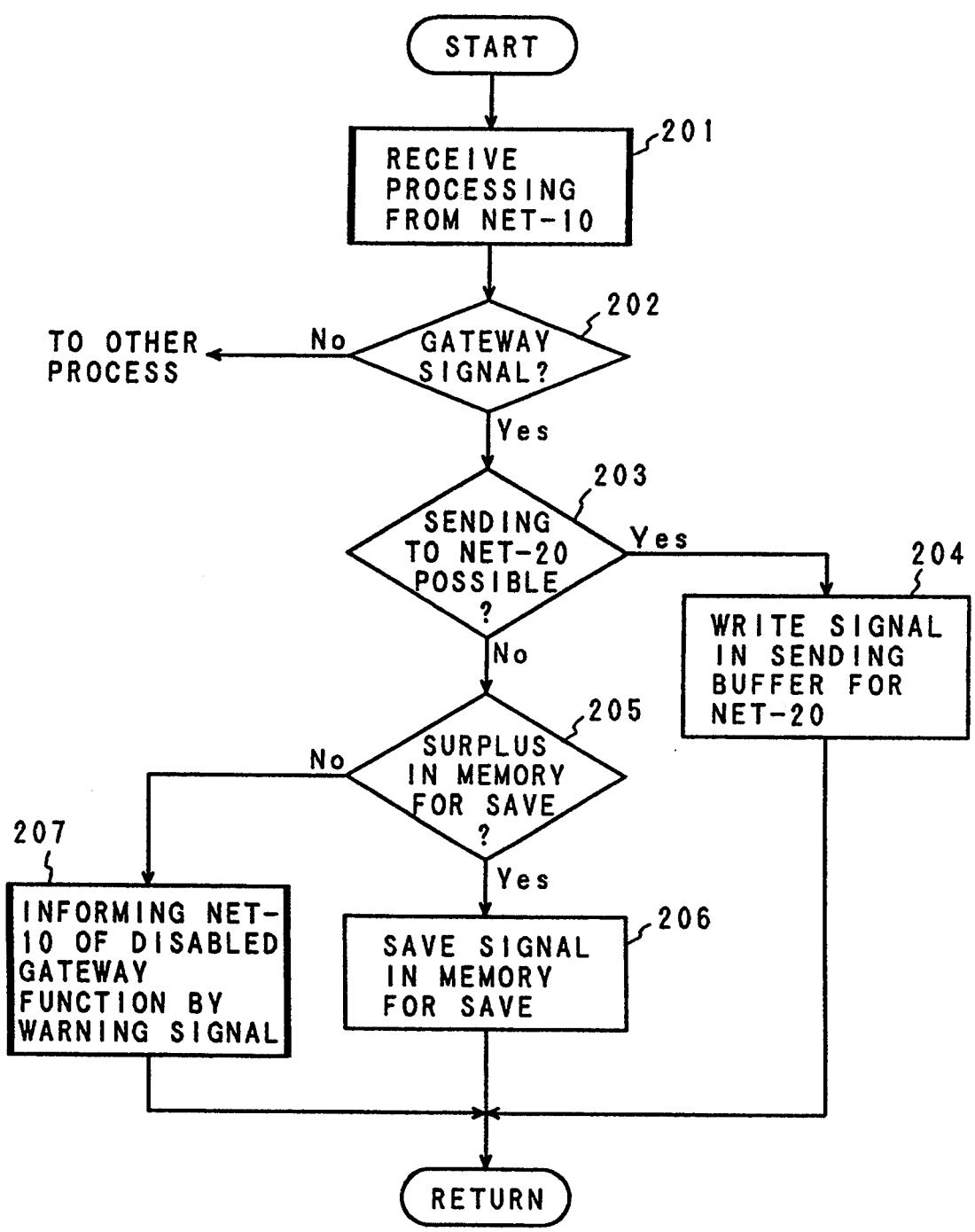
FIG. 4 is a flow chart for illustrating receive processing operation of a second embodiment of the gateway node shown in FIG. 1.

Referring now to the flow chart of FIG. 4, receive processing operation of a second embodiment of the gateway node for data transmission between the individual networks will be described. In connection with this embodiment, the case of transmitting specified data from the multiplex node 11 to the multiplex node 21 will be described.

On receiving a data signal from the network 10, the CPU 30a fetches this data signal from the communication control circuit 30b (Step 201), and determines, on the basis of ID data for the data signal and the like, whether or not the received data signal is a gateway object signal (Step 202).

If the data signal is not the gateway object signal, the CPU 30a executes another process for the object. If the data signal is the gateway object signal, on the other hand, it is determined whether or not the signal can be sent to the receiving-side network 20 (Step 203). This decision is made on the basis of a specified signal which, delivered from the communication control circuit 30c monitoring the operating state of the network 20, is indicative of the operating state.

If the data can be sent to the network 20, the CPU 30a writes the aforesaid data signal in the network-use sending buffer of the communication control circuit 30c (Step 204), whereupon the receive processing operation is finished. If the data cannot be sent to the network 20, on the other hand, it is determined whether or not the internal memory 30d for save has a storage capacity surplus large enough for temporary storage of the data signals to be sent to the network 20 (Step 205).

If the internal memory 30d for save has a storage capacity surplus, the CPU 30a writes the data signal in the internal memory 30d for save (Step 206), whereupon the receive processing operation is finished. If the internal memory 30d for save has no surplus for transmit data to be written therein, on the other hand, a warning signal is sent to the sending-side network 10 to inform it of the fact that the gateway function of the gateway node cannot be fulfilled (Step 207), whereupon the receive processing operation is finished.

Figure 5:
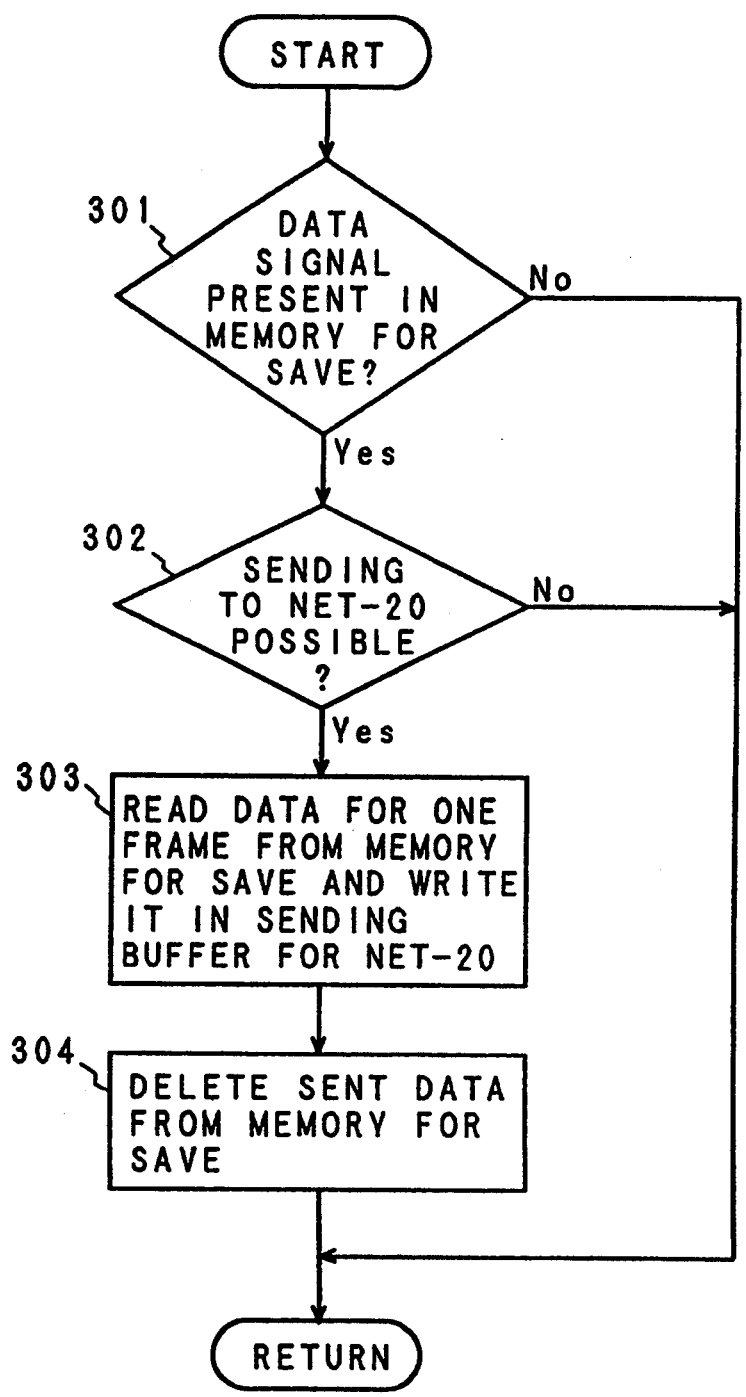
FIG. 5 is a flow chart showing a timer interruption routine for the gateway node shown in FIG. 1.

FIG. 5 is a flow chart showing a timer interruption routine the CPU 30a executes periodically.

First, the CPU 30a determines whether or not data signals to be subjected to the gateway function at predetermined time intervals are present in the internal memory 30d for save (Step 301).

If there are no data signals in the internal memory 30d for save, the CPU 30a finishes this interruption routine. If there are data signals in the internal memory 30d for save, on the other hand, the operating state of the network 20 is discriminated to determine whether data transmission is possible or not (Step 302).

If the network 20 is busy and is incapable of data transmission, the CPU 30a finishes the interruption routine. If the network 20 is off duty and is capable of data transmission, data signals for one relevant frame are read from the internal memory 30d for save, and these data signals are written in the network-use buffer of the communication control circuit 30c (Step 303). Further, the data signals read from the internal memory 30d for save are deleted (Step 304), whereupon the aforesaid timer interruption routine is finished.

Thus, if the network 20 is busy and is incapable of data transmission, the data signals to be sent are temporarily stored beforehand in the internal memory 30d for save. When the data transmission becomes impossible, the stored data signals can be written in tile network-use buffer. Thus, when writing the data in the network-use buffer is finished, the communication control circuit 30c can send a data signal of a frame configuration composed of ID data, a plurality of data, etc. in the network-use buffer to the multiplex node 11 of the network 20 to which a request-to-send has been addressed. If the storage capacity of the internal memory 30d for save, which is used to store the data signals temporarily, is exceeded, moreover, the CPU 30a can inform the network 10 to that effect.

According to the second embodiment, therefore, if the storage capacity of the internal memory for save is exceeded, the sending-side network can be informed of it so that the transmission control can be urged to switch over to a method which does not depend on the gateway function. Thus, the safety of the whole multiplex transmission system according to the present invention can be ensured.

According to the second embodiment, moreover, the internal memory for save is used to store the data signals from one of the networks. However, the present invention is not limited to this arrangement, and may be also arranged so that data signals from both the networks are stored in the memory, for example. In this case, the trouble of repeatedly sending the same data signals from the network can be saved, so that the data transmission can be carried out efficiently.

The following is a description of a third embodiment of the multiplex transmission system according to this invention, in which data responsive to a request-to-send is sent among other data stored in the internal memory 30d of the gateway node 30 shown in FIG. 1.

More specifically, in the case where a multiplex node of one of the networks fetches specified data from a multiplex node of the other network, it is necessary to address a request-to-send to the multiplex node of the other network through the gateway node, and to receive the specified data from the other network through the gateway node again. Thus, the time of occupancy of the network is prolonged to retard transmission of the other data, thereby constituting a hindrance.

Thereupon, the CPU 30a is connected to the networks 10 and 20 through the communication control circuits 30b and 30c, respectively, and writes, in the internal memory 30d, data fetched from the data bus 10a or 20a for each multiplex node and stored in the network-use buffer. Also, the CPU 30a fulfills gateway function such that relevant data is read from the internal memory 30d in response to the request-to-send to the multiplex node connected to the other network and converted into a data signal corresponding to the response characteristic of the other network, and is then sent back to a requested multiplex node. Thus, signals can be transmitted between the data buses 10a and 20a of the networks 10 and 20.

Figure 6:
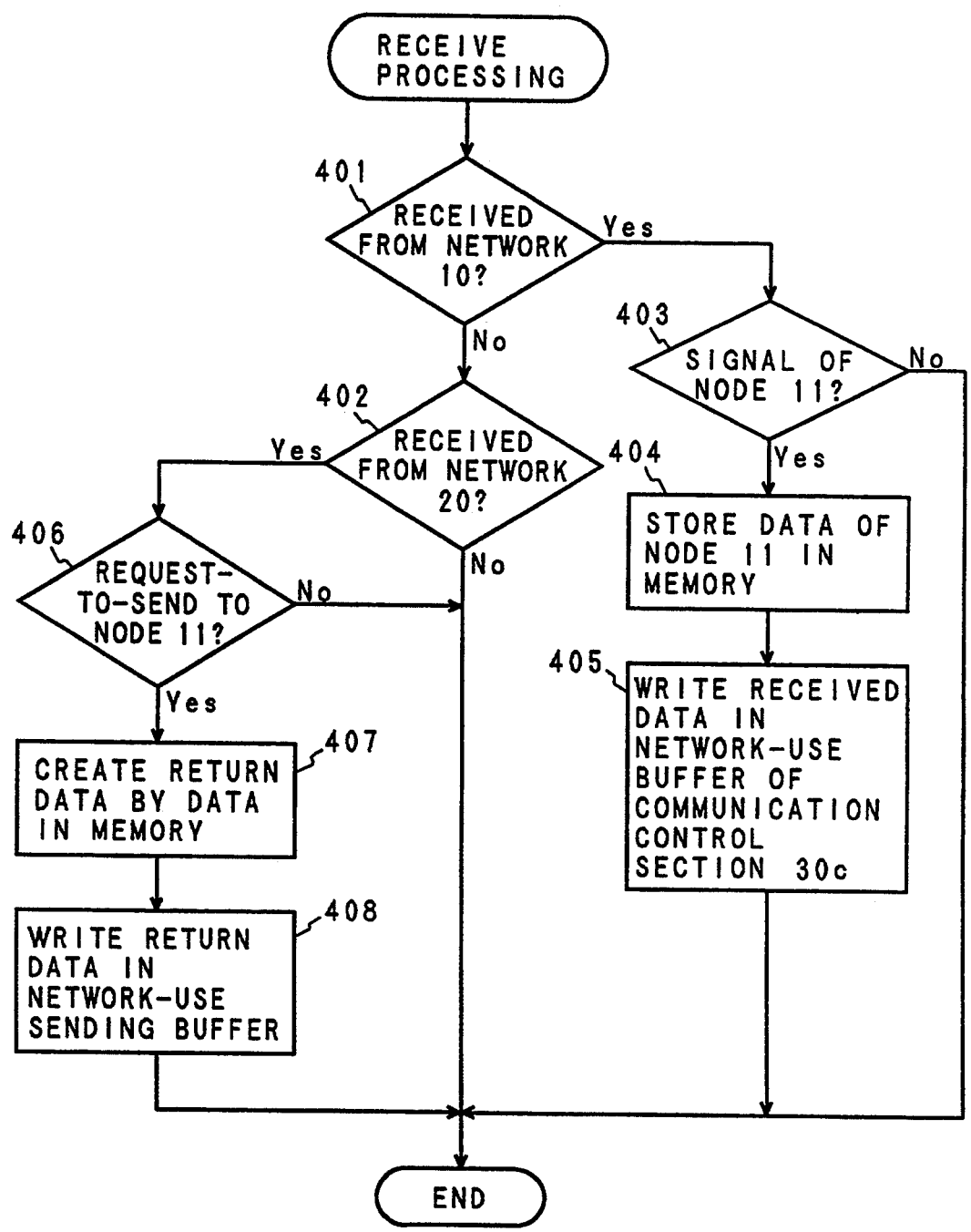
FIG. 6 is a flow chart for illustrating receive processing operation of a third embodiment of the gateway node shown in FIG. 1.

Referring now to the flow chart of FIG. 6, receive processing operation of a third embodiment of the gateway node for data transmission between the individual networks will be described. In connection with this embodiment, the case of transmitting specified data from the multiplex node 11 to the multiplex node 21 will be described.

On receiving a data signal, the CPU 30a determines, on the basis of ID data for the data signal and the like, whether or not the data signal has been received from the network 10 (Step 402).

If it is concluded that the data signal has not been received from the network 10, the CPU 30a then determines whether or not this data signal has been received from the network 20 (Step 402). It is concluded that the data signal has been received from the network 10, on the other hand, it is determined, on the basis of ID data for the signal and the like, whether or not the data signal is a signal from the multiplex node 11 (Step 403).

If the result is that the data signal is not a signal from the multiplex node 11, the CPU 30a finishes the receive processing operation. If the data signal is a signal from the multiplex node 11, on the other hand, the received data is fetched from the network-use buffer of the communication control circuit 30b and written in the internal memory 30d (Step 404). Further, this received data is written in the network-use sending buffer of the communication control circuit 30c (Step 405), whereupon the receive processing operation is finished.

If it is concluded, in the decision on the data signal based on the ID data and the like in Step 402, that the data signal has not been received from the network 20, the CPU 30a finishes the aforesaid receive processing operation. If it is concluded that this data signal has been received from the network 20, on the other hand, it is determined whether or not the data signal is indicative of a request-to-send to the multiplex node 11 (Step 406).

If the data signal is not indicative of a request-to-send to the multiplex node 11, the CPU 30a finishes the receive processing operation. If the data signal is a request-to-send to the multiplex node 11, on the other hand, data corresponding to the multiplex node 11, among other data stored in the internal memory 30d, is fetched and converted into a return data signal corresponding to the response characteristic of the network 20 (Step 407). Then, this return data signal is written in the network-use buffer of the communication control circuit 30c (Step 408), whereupon the aforesaid receive processing operation is finished.

Thus, when writing the data in the network-use buffer is finished, the communication control circuit 30c can send a data signal of a frame configuration composed of ID data, a plurality of data, etc. in the network-use buffer to the multiplex node 11 of the network 20 to which a request-to-send has been addressed.

According to the third embodiment, therefore, the CPU 30a normally stores the internal memory 30d of the gateway node 30 beforehand with the data of the multiplex node 11 according to, for example, its change, despite a request-to-send from the multiplex node 21 of the other network. When the request-to-send is addressed, the CPU 30a can read data corresponding to the request-to-send from the internal memory 30d and send it back to the multiplex node 21 as a request source for sending, without referring to the multiplex node 11. In addressing the request-to-send, therefore, the gateway node need not address the request-to-send to the corresponding multiplex node and receive data from this multiplex node, so that the return time for the request-to-send can be cut down. Thus, according to the third embodiment, the time of occupancy of the network corresponding to the time interval between the request-to-send and the return can be shortened. The multiplex node can obtain required data as if it were in communication with the multiplex node of the other network by only addressing the request-to-send to the gateway node. According to the third embodiment, therefore, the data transmission can be carried out efficiently.

According to the third embodiment, moreover, the internal memory is used to store the data from one of the multiplex nodes. However, the present invention is not limited to this arrangement, and the storage region of the internal memory may be arranged corresponding to each multiplex node so that data from each multiplex node can be stored, for example. Thus, the data of the other multiplex node can be efficiently received also from the multiplex node of either network.

Figure 7:
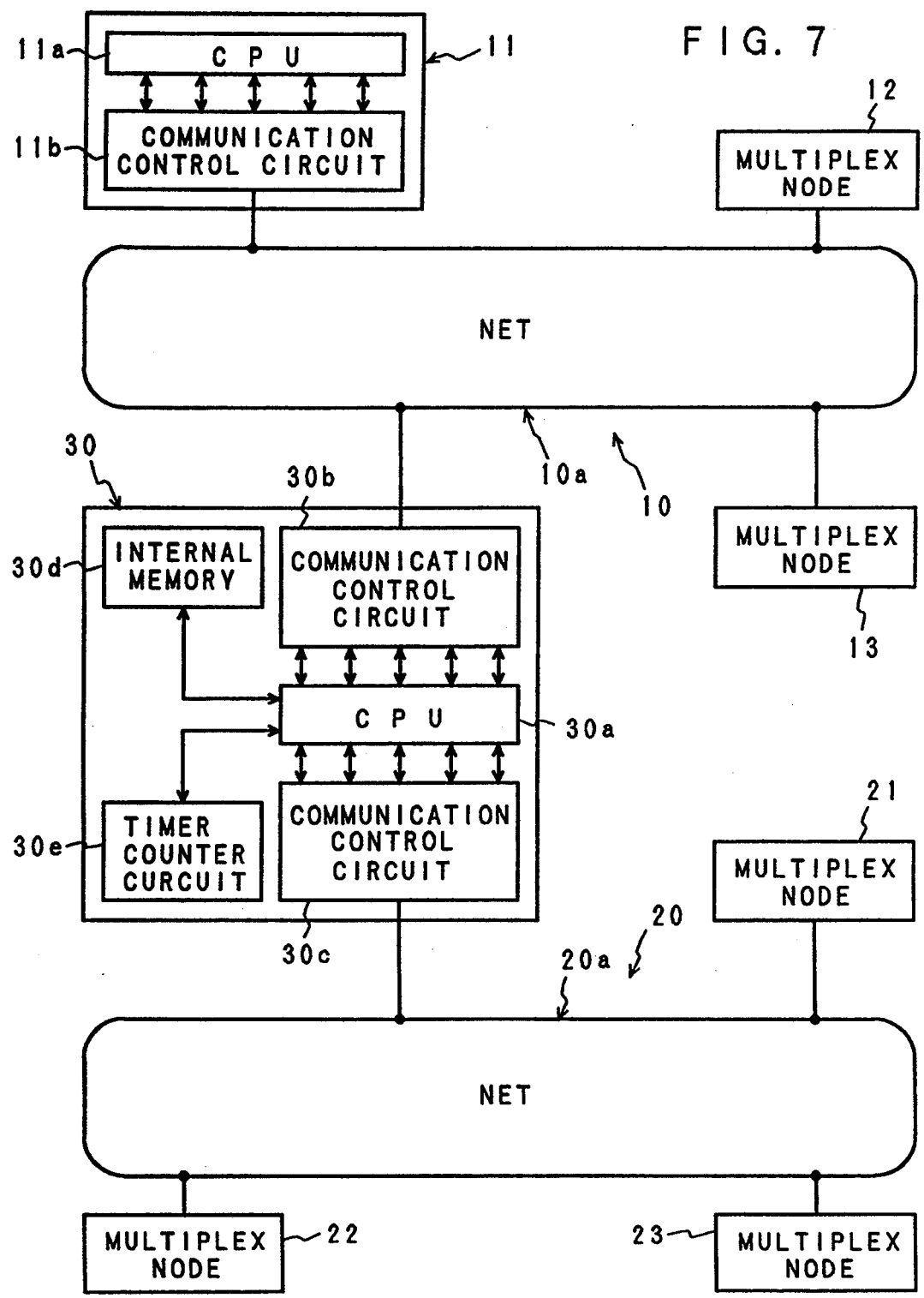
FIG. 7 is a block diagram showing an arrangement of another embodiment of the overall multiplex transmission system according to this invention.

The following is a description of another embodiment of the multiplex transmission system according to this invention. In this case, as shown in FIG. 7, a timer counter circuit is provided in the gateway node and used to detect data input time. In FIG. 7, other components except the gateway node 30 are arranged in the same manner as their counterparts in FIG. 1, so that a description of those components is omitted herein.

More specifically, even if no ACK signals can be sent due to failure of the other multiplex node in the sending-side network although the gateway node accurately receives transmit data, the source node resends the same transmit data, concluding that a transmission error has been caused. Thus, the gateway node must perform again the transmission control of the resent same transmit data by means of the gateway function, so that the transmission amount of the data sent to the receiving-side network is increased unduly. This causes the receiving-side network to be jammed inside with data transmission, thus hindering the transmission of the other transmit data (e.g., data transmission in the receiving-side network).

Thereupon, the gateway node 30 is arranged having a timer counter circuit 30d connected therein, as shown in FIG. 7, as well as a CPU 30a, communication control circuits 30b and 30c, an internal memory 30d, etc. which are the same components as are used in the gateway node of FIG. 1.

The CPU 30a is connected to networks 10 and 20 through the communication control circuits 30b and 30c, respectively, and reads new data fetched from data bus 10a or 20a for each multiplex node and stored in a network-use buffer. Also, the CPU 30a compares data written last in the internal memory 30d and the new data, thereby determining whether or not these two data are equal. When the new data is inputted, the CPU 30a controls the timer counter circuit 30d so that counting is executed until the input is finished, and determines whether or not the resulting count value is within the range of a predetermined time T (e.g., T=5 msec). The predetermined time T is set at 5 msec for the following reason. Normally, the data frame of a data signal takes a little over 4 msec. Adding this time to the time for fetching this data signal and the time for recognizing the ACK signal area (see FIG. 2) of the data frame, it can be believed that the resending will have been finished within 5 msec after the reception of the first data at the latest.

If the aforesaid two data are equal, and if the count value is within the range of the predetermined time, the CPU 30a concludes that the newly inputted data signal is a data signal resent due to a transmission error, and ceases from sending the data signal to the other network. In any other case, that is, if the two data are not equal, or if the count value is not within the range of the predetermined time T, the CPU 30a concludes that the inputted data signal is new data, and writes relevant data in the internal memory 30d. Thereafter, the CPU 30a fulfills its gateway function such that relevant data is read from the internal memory 30d and converted into a data signal corresponding to the response characteristic of the other network, and is then sent back to a multiplex node which is requested to send. Thus, signals can be transmitted between the data buses 10a and 20a of the networks 10 and 20.

Referring now to the flow chart of FIG. 8, receive processing operation of a fourth embodiment of the gateway node for data transmission between the individual networks will be described. In connection with this fourth embodiment, the case of transmitting specified data from the multiplex node 11 to the multiplex node 21 will be described.

On receiving a data signal from the network 10, the CPU 30a fetches this data signal from the communication control circuit 30b, and compares this data and data written last in the internal memory 30d, thereby determining whether the two data are equal or not (Step 501).

If the two data are equal, the CPU 30a determines whether or not the count value of the timer counter circuit 30e is not smaller than the value of the predetermined time T (Step 502). If the two data are not equal, it is concluded that the fetched data signal is not a resent signal but a data signal newly sent from the network 1. After the fetched data signal is written and stored in the internal memory 30d, the aforesaid data signal is written in the network-use sending buffer of the communication control circuit 30c (Step 503). Further, the CPU 30a clears the count value of the timer counter circuit 30e, restarts counting from "0" (Step 504), and performs receive processing operation for a data signal to be inputted next.

If it is concluded in Step 502 that the count value of tile timer counter circuit 30e is not smaller than the value of the predetermined time T, the CPU 30a also concludes that the fetched data signal is a data signal newly sent from the network 10, stores the internal memory 30d with this data signal, and then writes the data signal in the network-use sending buffer of the communication control circuit 30c (Step 503). Further, the count value of the timer counter circuit 30e is cleared, and counting is restarted (Step 504). If the count value is smaller than the value of the predetermined time T, on the other hand, it is concluded that the fetched data signal is a resent signal, and the count value of the timer counter circuit 30e is cleared, and counting is restarted (Step 504), without executing the storage in the memory in Step 503, and receive processing operation for a data signal to be inputted next is performed.

Thus, if the inputted data signal from the network 10 is equal to the data written last in the internal memory 30d, and if the input time for this data signal is within the range of the predetermined time T, the CPU 30a can skip the process for sending to the network 20, concluding that the inputted data signal is a data signal resent from the multiplex node 11. If the two data are not equal, or if the input time for the data signal is not shorter than the predetermined time T, the CPU 30a can execute the process for sending to the network 20, concluding that the inputted data signal is a data signal newly sent from the network 10.

According to the fourth embodiment, therefore, the gateway node can detect the resent data signal if a transmission error is caused despite its accurate reception of the transmit data. Thus, according to the fourth embodiment, the same data signal cannot be sent by means of the gateway function, so that the transmission amount of the data sent to the receiving-side network can be reduced. As a result, the same transmit data cannot be sent again to the receiving-side network, so that the data transmission can be carried out efficiently without exerting a bad influence upon the data transmission in the receiving-side network.

According to the description in connection with the fourth embodiment, the transmission of the data signal from the network 10 to the network 20 is controlled. However, the present invention is not limited to this arrangement, and may be also applied to the control of data signal transmission from both of the networks. In this case, therefore, the data transmission can be carried out more efficiently.

We claim:

1. An apparatus for connecting at least two multiplex transmission systems, each multiplex transmission system including at least two multiplex nodes and a signal transmission line interconnecting the multiplex nodes, the apparatus comprising:

transmission control means including a storage section for storing data supplied through each of the signal transmission lines, and means for transmitting the stored data for data transmission among the multiplex transmission systems, wherein said transmission control means further includes:

means for determining whether transmission of transmit data supplied from one of said at least two multiplex transmission systems to another of said at least two multiplex transmission systems is possible, in accordance with a state of use of the signal transmission line of said another multiplex transmission system, and for determining whether storage of the transmit data in the storage section is possible;

means for storing the transmit data in the storage section when transmission of the transmit data is impossible and at the same time storage of the transmit data is possible, and means for transmitting the stored transmit data to the signal transmission line of said another of the multiplex transmission systems when transmission of the transmit data becomes possible; and means for informing said one of the multiplex transmission systems of a transmission/storage inability state when neither transmission nor storage of the transmit data is possible.

2. The apparatus of claim 1, wherein said transmission control means further includes:

means for determining whether or not the transmit data are stored in said storage section at predetermined intervals;

means for determining whether or not sending of said stored transmit data to said other signal transmission line is possible when the transmit data is stored; and means for sending out said transmit data in accordance with the result of said determination of whether or not sending of said stored transmit data is possible.

* * * * *